(12) United States Patent
Lin et al.

(10) Patent No.: US 11,850,833 B2
(45) Date of Patent: Dec. 26, 2023

(54) FLEXIBLE DISPLAY PANEL

(71) Applicant: E Ink Holdings Inc., Hsinchu (TW)

(72) Inventors: Yi-Sheng Lin, Hsinchu (TW);
Chen-Chu Tsai, Hsinchu (TW);
Chia-Chun Yeh, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/445,954

(22) Filed: Aug. 26, 2021

(65) Prior Publication Data

US 2022/0212434 A1 Jul. 7, 2022

(30) Foreign Application Priority Data

Jan. 5, 2021 (TW) .................................. 110100260

(51) Int. Cl.
*B32B 3/12* (2006.01)

(52) U.S. Cl.
CPC ............ *B32B 3/12* (2013.01); *B32B 2457/20* (2013.01)

(58) Field of Classification Search
CPC ................................ B32B 3/12; B32B 245/20
See application file for complete search history.

(56) References Cited

U.S. PATENT DOCUMENTS

| | | | | |
|---|---|---|---|---|
| 3,656,992 A * | 4/1972 | Lynam | ...................... | C09J 5/06 156/197 |
| 6,930,818 B1 * | 8/2005 | Liang | .................... | B29C 39/026 345/107 |
| 9,395,595 B2 | 7/2016 | Zhang | | |
| 9,645,468 B2 | 5/2017 | Lee et al. | | |
| 2013/0208343 A1 | 8/2013 | Yang et al. | | |
| 2015/0268697 A1* | 9/2015 | Nam | ...................... | G06F 1/1643 428/157 |
| 2019/0049630 A1* | 2/2019 | Chuang | ................. | B32B 27/365 |

FOREIGN PATENT DOCUMENTS

| | | |
|---|---|---|
| CN | 1818768 A | 8/2006 |
| CN | 101592838 A | 12/2009 |
| CN | 101598880 A | 12/2009 |
| CN | 102681285 A | 9/2012 |
| CN | 107204154 A | 9/2017 |
| CN | 109980124 A | 7/2019 |
| CN | 110752232 A | 2/2020 |
| CN | 111798751 A | 10/2020 |

(Continued)

OTHER PUBLICATIONS

Action Press, "Paper Thickness and Weight Explained", 2018, p. 1-6; https://action-press.co.uk/blog/paper-thickness-and-weight-explained/.*

(Continued)

*Primary Examiner* — Mark Ruthkosky
*Assistant Examiner* — Julia L Rummel
(74) *Attorney, Agent, or Firm* — CKC & Partners Co., LLC

(57) ABSTRACT

A flexible display panel can be bent around an axis, and includes a flexible substrate and an accommodating structure. The accommodating structure is disposed on the flexible substrate and includes a plurality of polygonal microcups connected to each other, where the polygonal microcups are arranged regularly, and the axis is not substantially parallel to any sidewall of each polygonal microcup.

11 Claims, 15 Drawing Sheets

(56) References Cited

FOREIGN PATENT DOCUMENTS

| CN | 111986571 A | 11/2020 |
|----|-------------|---------|
| TW | 201411226 A | 3/2014  |
| TW | M541027 U   | 5/2017  |

OTHER PUBLICATIONS

Corresponding Taiwan office action dated Mar. 14, 2022.
G. Bianchi et al., "Experimental Investigation of Static and Fatigue Behaviour of Honeycomb Panels under In-plane Shear Loads", AIAA, 2009.
The office action of corresponding CN application No. CN202110008044.9 dated Oct. 25, 2023.

\* cited by examiner

FLEXIBLE DISPLAY PANEL

CROSS-REFERENCE TO RELATED APPLICATION

This application claims priority to Taiwan Application Serial Number 110100260, filed Jan. 5, 2021, which is herein incorporated by reference in its entirety.

BACKGROUND

Technical Field

The present disclosure relates to a display. More particularly, the present disclosure relates to a flexible display panel.

Description of Related Art

The existing display technology has developed a flexible display panel, in which the flexible display panel can be bent repeatedly many times. However, the existing flexible display panel is usually damaged after certain times of bending. Thus, many manufacturers are studying how to enhance the tolerant strength of the flexible display panel, so as to increase the times of bending that the flexible display panel can withstand, thereby improving the lifetime of the flexible display panel.

SUMMARY

At least one embodiment of the disclosure provides a flexible display panel including an accommodating structure that can enhance the tolerant strength of the flexible display panel, so as to increase the times of bending that the flexible display panel can withstand.

A flexible display panel according to at least one embodiment of the disclosure can be bent around an axis and includes a flexible substrate and an accommodating structure. The accommodating structure is disposed on the flexible substrate and includes a plurality of polygonal microcups connected to each other, in which the polygonal microcups are arranged regularly, and the abovementioned axis is not substantially parallel to any sidewall of each of the polygonal microcups.

A flexible display panel according to at least one embodiment of the disclosure can be bent around an axis and includes a flexible substrate and an accommodating structure. The accommodating structure is disposed on the flexible substrate and includes a plurality of polygonal microcups connected to each other, in which the polygonal microcups are arranged regularly. Each of the polygonal microcups has a width and a thickness, where a ratio value of the width to the thickness ranges between 5 and 80.

Based on the above, under the condition that the abovementioned axis is not substantially parallel to any sidewall of each polygonal microcup, the accommodating structure can enhance the tolerant strength of the flexible display panel, so as to increase the times of bending that the flexible display panel can withstand, thereby improving the, thereby improving the lifetime of the flexible display panel.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
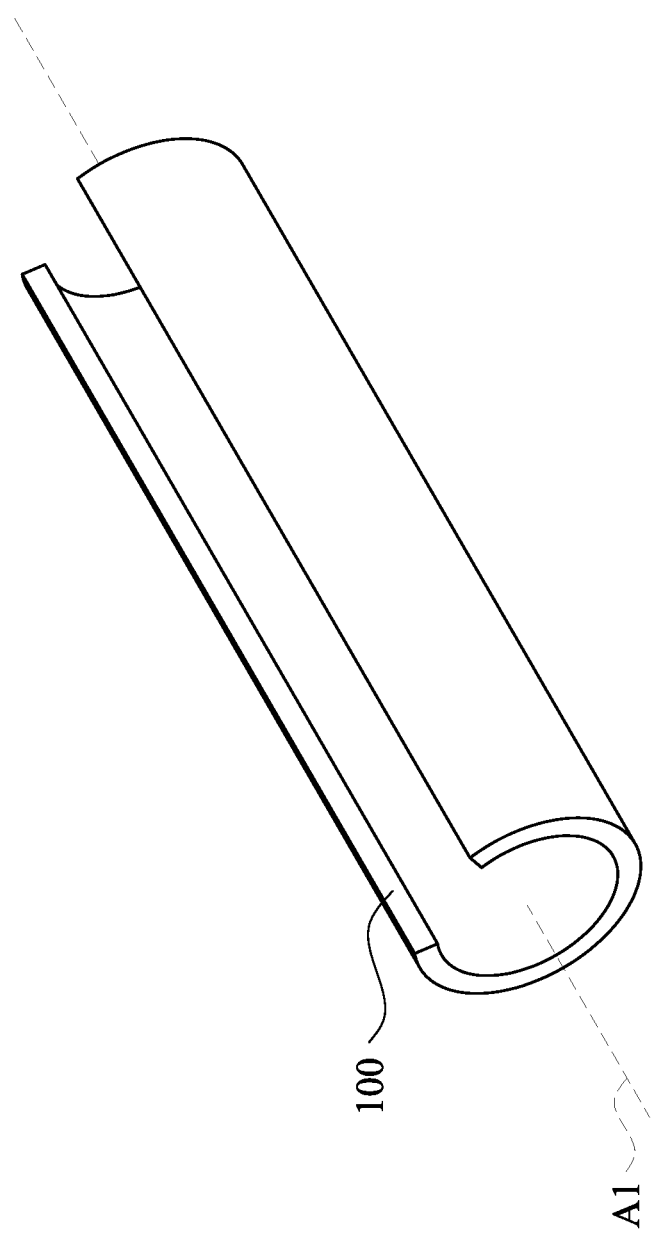
FIG. 1A is a schematic perspective view of a flexible display panel according to at least one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

In the following description, in order to clearly present the technical features of the present disclosure, the dimensions (such as length, width, thickness, and depth) of elements (such as layers, films, substrates, and areas) in the drawings will be enlarged in unusual proportions. Accordingly, the description and explanation of the following embodiments are not limited to the sizes and shapes of the elements presented in the drawings, but should cover the sizes, shapes, and deviations of the two due to actual manufacturing processes and/or tolerances. For example, the flat surface shown in the drawings may have rough and/or non-linear characteristics, and the acute angle shown in the drawings may be round. Therefore, the elements presented in the drawings in this case which are mainly for illustration are intended neither to accurately depict the actual shape of the elements nor to limit the scope of patent applications in this case.

FIG. 1A is a schematic perspective view of a flexible display panel according to at least one embodiment of the disclosure. Referring to FIG. 1A, a flexible display panel 100 in the embodiment can be bent around an axis A1, where the term "bent" herein includes "rolled" and "folded". Taking FIG. 1A for example, the flexible display panel 100 can be rolled around the axis A1 into a tube, and the flexible display panel 100 further can be rolled around the axis A1 repeatedly many times.

Figure 1B:
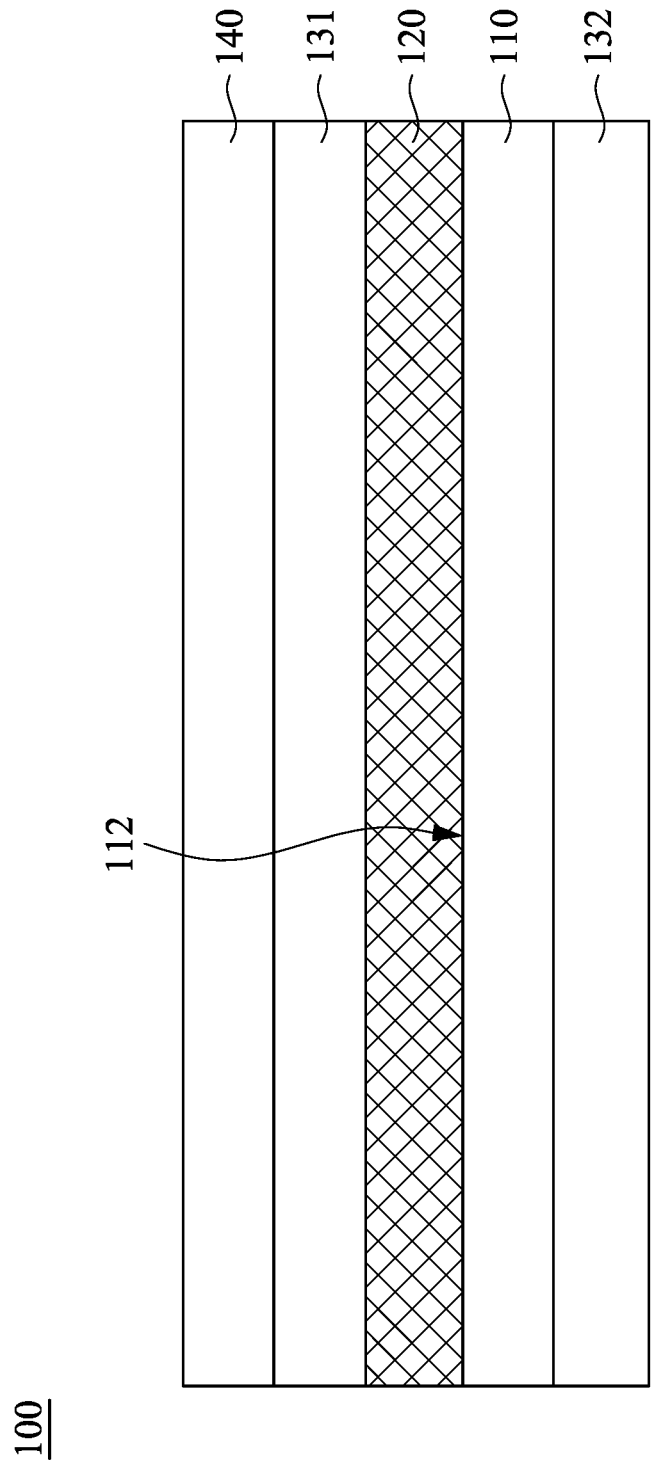
FIG. 1B is a schematic cross-sectional view of the flexible display panel in FIG. 1A.

FIG. 1B is a schematic cross-sectional view of the flexible display panel in FIG. 1A. Referring to FIG. 1B, the flexible display panel 100 includes a flexible substrate 110 and an accommodating structure 120, in which the accommodating structure 120 is disposed on the surface 112 of the flexible substrate 110. The material of the accommodating structure 120 can be selected from one of or the group consisting of epoxy acrylate, monomer, urethane ebecryl, polymethyl-methacrylate, photoinitiator, cationic photoinitiator, and acetone. That is, the accommodating structure 120 can be made of at least one of the abovementioned epoxy acrylate, monomer, urethane ebecryl, polymethyl-methacrylate, photoinitiator, cationic photoinitiator, and acetone.

The flexible substrate 110 can have circuitry (not shown), which can include a plurality of control components, in which the control component may be a transistor or a diode. Specifically, the flexible display panel 100 can be an active display panel or a passive display panel. When the flexible display panel 100 is the active display panel, the control components of the flexible substrate 110 can be transistors, such as thin-film transistors (TFTs). When the flexible display panel 100 is the passive display panel, the control components of the flexible substrate 110 can be diodes.

The flexible display panel 100 can further include two protective layers 131, 132, and a functional layer 140. Both of the protective layers 131 and 132 are disposed on the accommodating structure 120 and the flexible substrate 110, in which the accommodating structure 120 and the flexible substrate 110 are located between both of the protective layers 131 and 132. Accordingly, the protective layers 131 and 132 can protect the accommodating structure 120 and the flexible substrate 110. The functional layer 140 can be disposed on the protective layer 131 and provide additional function. For example, the functional layer 140 can be a touch sensing layer, so that the flexible display panel 100 can have the function of touch sensing. Alternatively, the functional layer 140 can be an anti-reflective (AR) layer, so as to reduce the light reflecting off the flexible display panel 100, thereby improving the image quality.

Figure 1C:
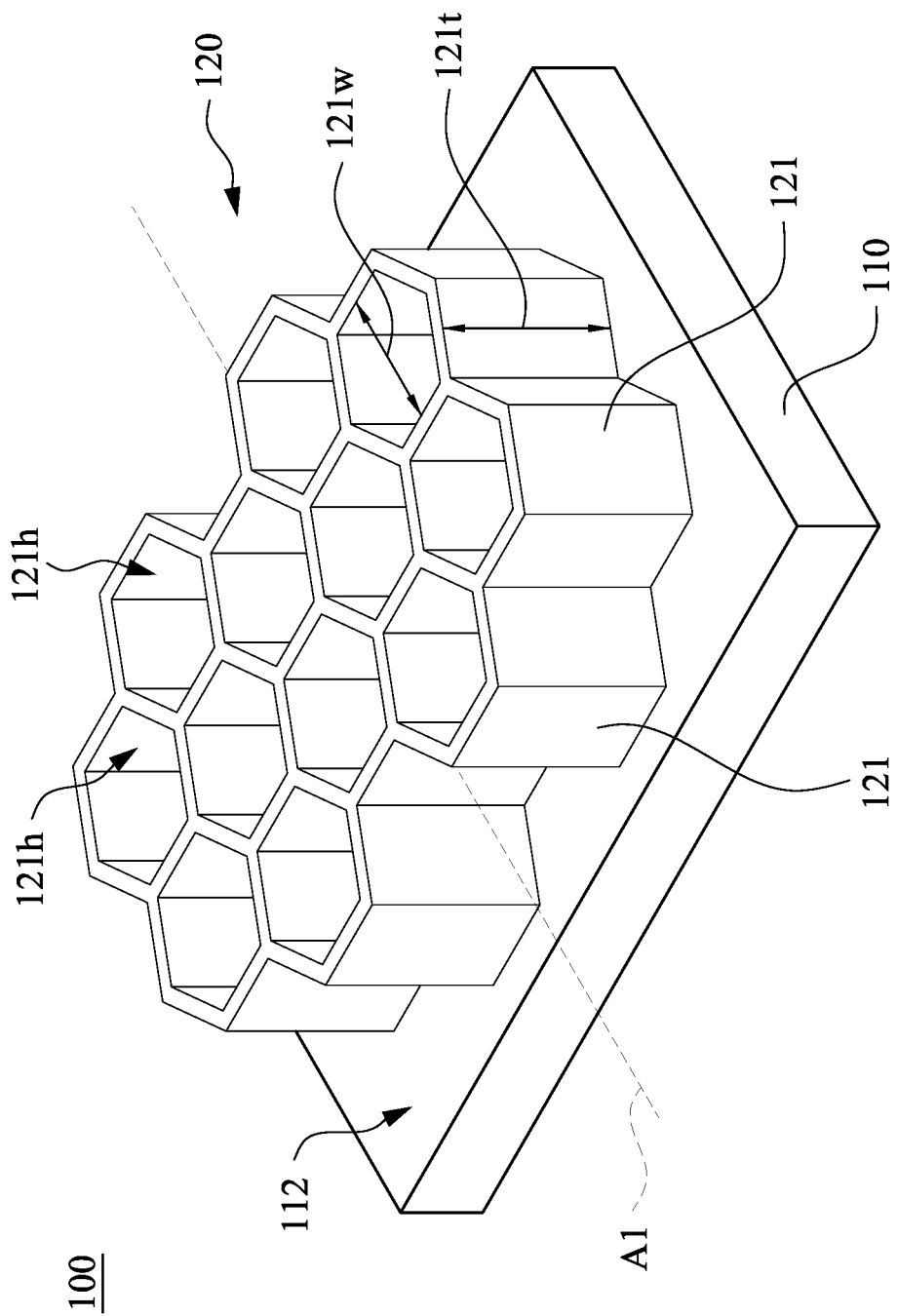
FIG. 1C is a schematic perspective view of the accommodating structure in FIG. 1B.
Figure 1D:
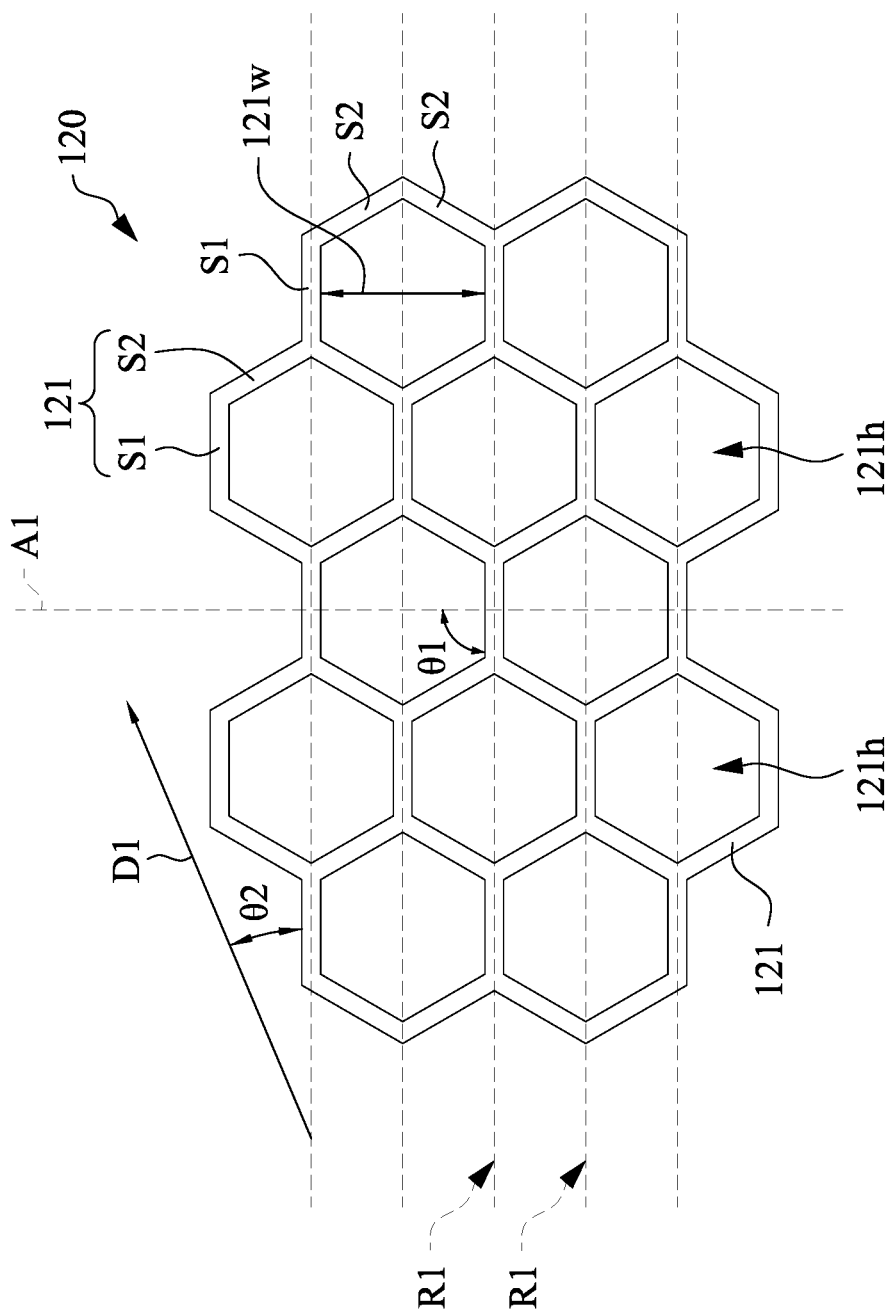
FIG. 1D is a schematic top view of the accommodating structure in FIG. 1C.

FIG. 1C is a schematic perspective view of the accommodating structure in FIG. 1B, and FIG. 1D is a schematic top view of the accommodating structure in FIG. 1C. Referring to FIGS. 1C and 1D, the accommodating structure 120 includes a plurality of polygonal microcups 121 which are connected to each other and arranged regularly. In the embodiment, the polygonal microcup 121 can be a hexagonal microcup, and the polygonal microcups 121 can be arranged in a honeycomb. Hence, each of the polygonal microcups 121 basically takes the shape of a hexagonal prism and has a hole 121h, where the accommodating space of the hole 121h also can take the shape of a hexagonal prism basically. In addition, the heights of the polygonal microcups 121 relative to the surface 112 are substantially equal to each other.

Each of the polygonal microcups 121 includes two first sidewalls S1 and a plurality of second sidewalls S2, in which the first sidewalls S1 are opposite to and substantially parallel to each other, and both shapes of the first sidewall S1 and the second sidewall S2 are substantially the same. Hence, the first sidewalls S1 can substantially lie in a plurality of reference planes R1 that are substantially parallel to each other, where all of the reference planes R1 are virtual plane. The second sidewalls S2 are connected to the first sidewalls S1, in which two first sidewalls S1 and four second sidewalls S2 can form a polygonal microcup 121, i.e., a hexagonal microcup, and surround a hole 121h, as shown in FIG. 1D. In addition, two polygonal microcups 121 connected to each other can share one first sidewall S1 or one second sidewall S2.

The hole 121h of each of the polygonal microcups 121 can accommodate image-display ink (not shown), in which the image-display ink may be electrophoretic ink used in an electrophoretic display (EPD) panel. The circuitry of the flexible substrate 110 (referring to FIG. 1B) can further include a plurality of the electrodes (not shown), in which the electrodes electrically connected to the control components may be located at the bottoms of the holes 121h, so that the control components can generate electric fields in the holes 121h via the electrodes. Thus, the control components of the flexible substrate 110 can control the image-display ink in the holes 121h, so that the flexible display panel 100 can display images.

The flexible display panel 100 can be bent (e.g., rolled) around the axis A1, in which the axis A1 is not substantially parallel to any sidewall of each of the polygonal microcups 121, i.e., not parallel to the first sidewall S1 and the second sidewall S2. For example, under the condition that each of the polygonal microcups 121 substantially takes the shape of a regular hexagonal prism, the angle of each of the polygonal microcups 121, that is, the included angle between two adjacent sidewalls (e.g., both of the first sidewall S1 and the second sidewall S2, or two adjacent second sidewalls S2) is substantially 120°.

Each of the polygonal microcups 121 has a width 121w and a thickness 121t. Since each of the polygonal microcups 121 substantially takes the shape of a regular hexagonal prism, the width 121w can be equivalent to a distance between two opposite first sidewalls S1 or a distance between two opposite second sidewalls S2 in the same polygonal microcup 121. In addition, in the embodiment, the ration value of the width 121w to the thickness 121t can range between 0.5 and 1.5.

Under the condition that the angle of each of the polygonal microcups 121 is substantially 120°, the axis A1 is not substantially parallel to any one of the first sidewalls S1 and the second sidewalls S2 of each of the polygonal microcups 121 when the included angle θ1 between the axis A1 and the reference plane R1 (equivalent to the first sidewall S1) is larger than 60°, and less than or equal to 90°. In addition, in the embodiment shown in FIG. 1D, the included angle θ1 is substantially equal to 90°, so that the axis A1 is substantially perpendicular to the reference planes R1, that is, the axis A1 is substantially perpendicular to the first sidewall S1 and not substantially parallel to any one of the first sidewalls S1 and the second sidewalls S2.

Figure 1E:
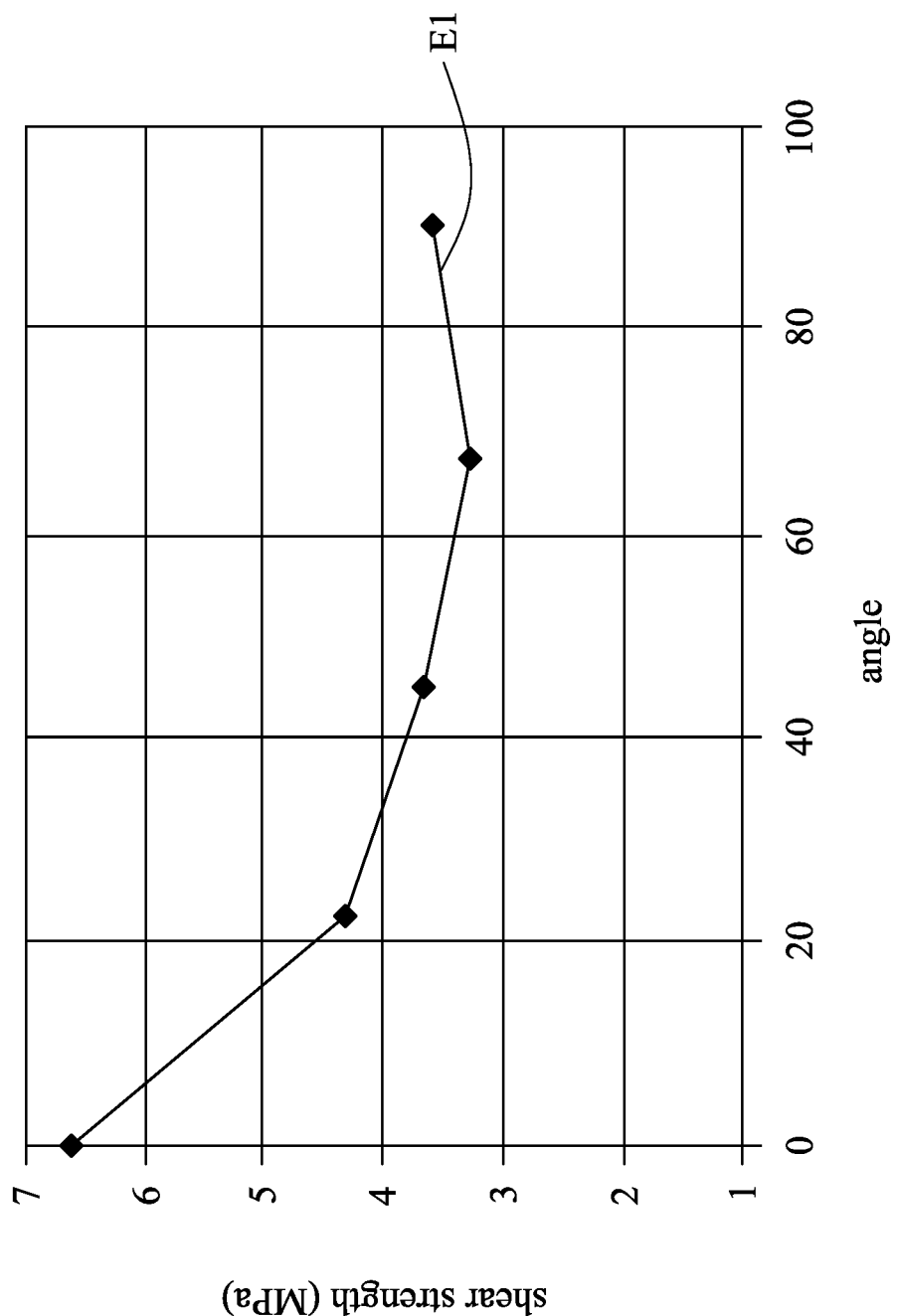
FIG. 1E is a schematic line chart of the variation in the shear strength of the accommodating structure in FIG. 1D with different directions.

FIG. 1E is a schematic line chart of the variation in the shear strength of the accommodating structure in FIG. 1D with different directions, in which the "shear strength" shown in the vertical axis of FIG. 1E is measured by applying stress to the accommodating structure 120 in a direction parallel to the direction D1 in FIG. 1D, and the unit of the shear strength is megapascals (MPa). The "angle" shown in the horizontal axis of FIG. 1E is the angle θ2 between the direction D1 and the reference plane R1 in FIG. 1D, so that the "angle" shown in the horizontal axis of FIG. 1E represents the direction of stress. In addition, the direction D1 is substantially parallel to the surface 112 of the flexible substrate 110, so that the stress used for measuring the shear strength is applied to the accommodating structure 120 along the surface 112 basically.

When the angle shown in the horizontal axis of FIG. 1E (i.e., included angle θ2) is 0°, it means that the stress is substantially applied to the accommodating structure 120 in the direction parallel to the reference plane R1 (equivalent to the first sidewall S1) and the surface 112. When the angle shown in the horizontal axis of FIG. 1E (i.e., included angle θ2) is 90°, it means that the stress is substantially applied to the accommodating structure 120 in the direction perpendicular to the reference plane R1.

As seen from the line E1 shown in FIG. 1E, when the included angle θ2 is 0°, the accommodating structure 120 has the strongest shear strength. In other words, the accommodating structure 120 has the best shear strength (about larger than 6.5 MPa) in the direction parallel to the reference plane R1 (equivalent to the first sidewall S1) and the surface 112, so that the accommodating structure 120 is capable of withstanding the stress in the direction parallel to the reference plane R1 and the surface 112.

Conversely, when the included angle θ2 is 90°, the accommodating structure 120 has a weak shear strength (about 3.5 MPa), so that the accommodating structure 120 has a bad shear strength in the direction perpendicular to the reference plane R1. That is to say, the accommodating structure 120 is not capable of withstanding the stress in the direction perpendicular to the reference plane R1. Moreover, it can be known from the line E1 shown in FIG. 1E that when the included angle θ2 is larger than 60° and close to 70°, the accommodating structure 120 has the weakest shear strength, which is equal to about 3.5 MPa.

When the flexible display panel 100 is bent around the axis A1 without limiting the included angle θ1, the accommodating structure 120 can generate the stress in the direction perpendicular to the axis A1. For example, when the flexible display panel 100 is bent around the axis A1 that is substantially perpendicular to the reference plane R1 (i.e., the included angle θ1 is substantially equal to 90°), the accommodating structure 120 can generate the stress in the direction substantially parallel to the reference plane R1 and the surface 112, where the stress is substantially perpendicular to the axis A1 and parallel to the direction D1 when the included angle θ2 is 0°.

Since the accommodating structure 120 has the best shear strength in the direction parallel to the reference plane R1 and the surface 112, and is capable of withstanding the stress in the direction parallel to the reference plane R1 and the surface 112, under the condition that the axis A1 is substantially perpendicular to the reference plane R1, in contrast to the existing flexible display panel, the flexible display panel 100 which can be bent around the axis A1 can withstand more times of bending, thereby having longer lifetime.

In addition, as seen from the line E1 shown in FIG. 1E, in the range of the included angle θ2 less than 30°, the accommodating structure 120 still has a good shear strength. Thus, in the range of the included angle θ1 formed between the axis A1 and the reference plane R1 larger than 60°, and less than or equal to 90° range, that is, under the condition that the axis A1 is not substantially parallel to any one of the first sidewalls S1 and the second sidewalls S2 of each of the polygonal microcups 121, in contrast to the existing flexible display panel, the flexible display panel 100 which can be bent around the axis A1 still can withstand more times of bending.

Figure 1F:
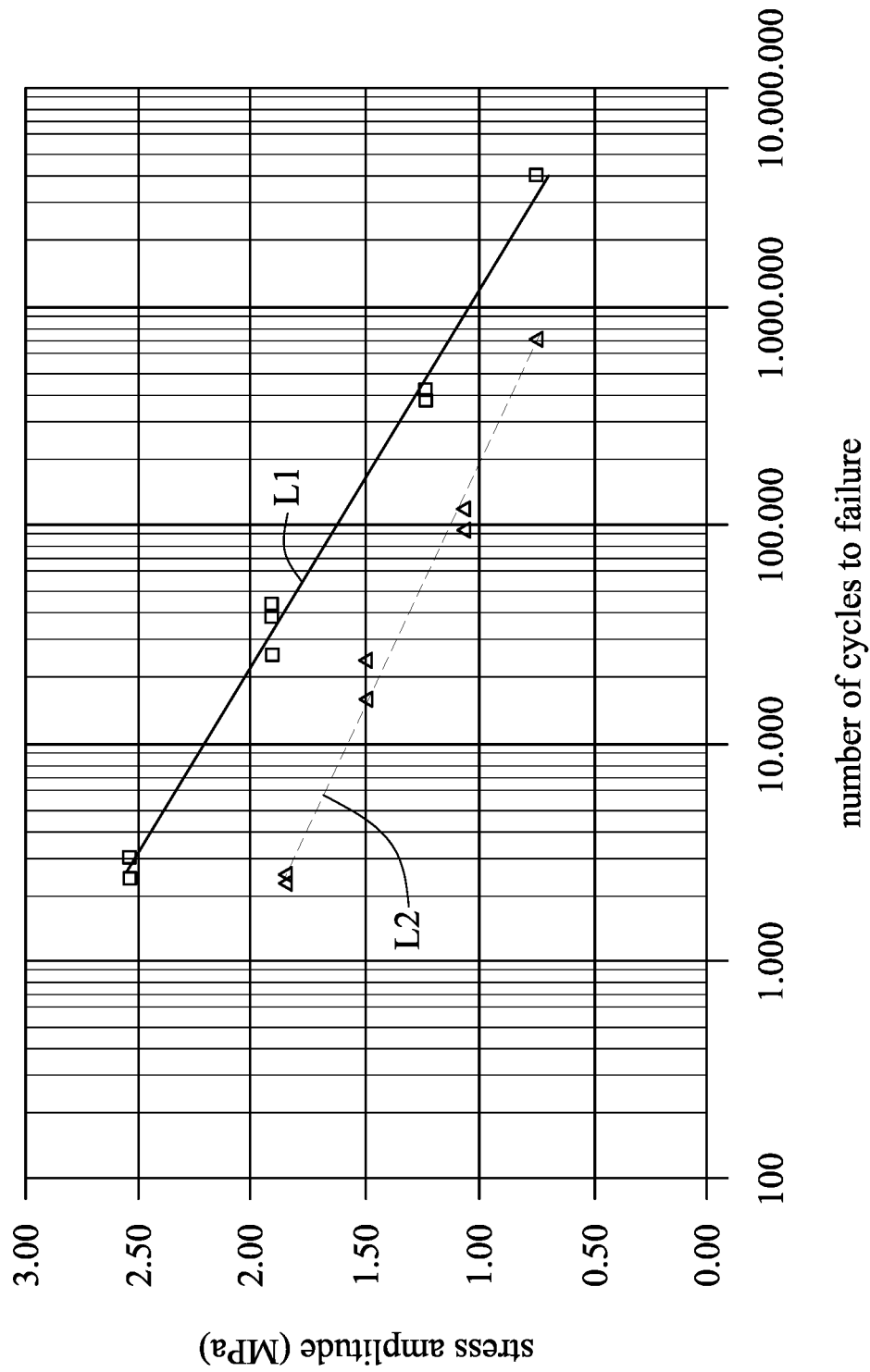
FIG. 1F is a schematic line chart measured by a stress fatigue testing of the accommodating structure in FIG. 1D in two different directions.

FIG. 1F is a schematic line chart measured by a stress fatigue testing of the accommodating structure in FIG. 1D in two different directions, in which the "stress amplitude" in the vertical axis of FIG. 1F is the magnitude of the stress applied to the accommodating structure 120 in unit of megapascal (MPa), whereas the "number of cycles to failure" in the horizontal axis of FIG. 1F means the necessary times of applying the stress to the accommodating structure 120 in order to break the accommodating structure 120. The line L1 in FIG. 1F represents the stress applied in the direction parallel to the reference plane R1 and the surface 112, whereas the line L2 represents the stress applied in the direction perpendicular to the reference plane R1.

Referring to FIGS. 1D and 1F, it can be seen from FIG. 1F that under the condition that the stress applied to the accommodating structure 120 has the constant magnitude, the stress applied in the direction parallel to the reference plane R1 and the surface 112 requires more times to be applied for breaking the accommodating structure 120, but the stress applied to the accommodating structure 120 few times in the direction perpendicular to the reference plane R1 can break the accommodating structure 120. Hence, under the condition that the axis A1 is substantially perpendicular to the reference plane R1, the flexible display panel 100 bent around the axis A1 can withstand more times of bending, indeed.

Figure 1G:
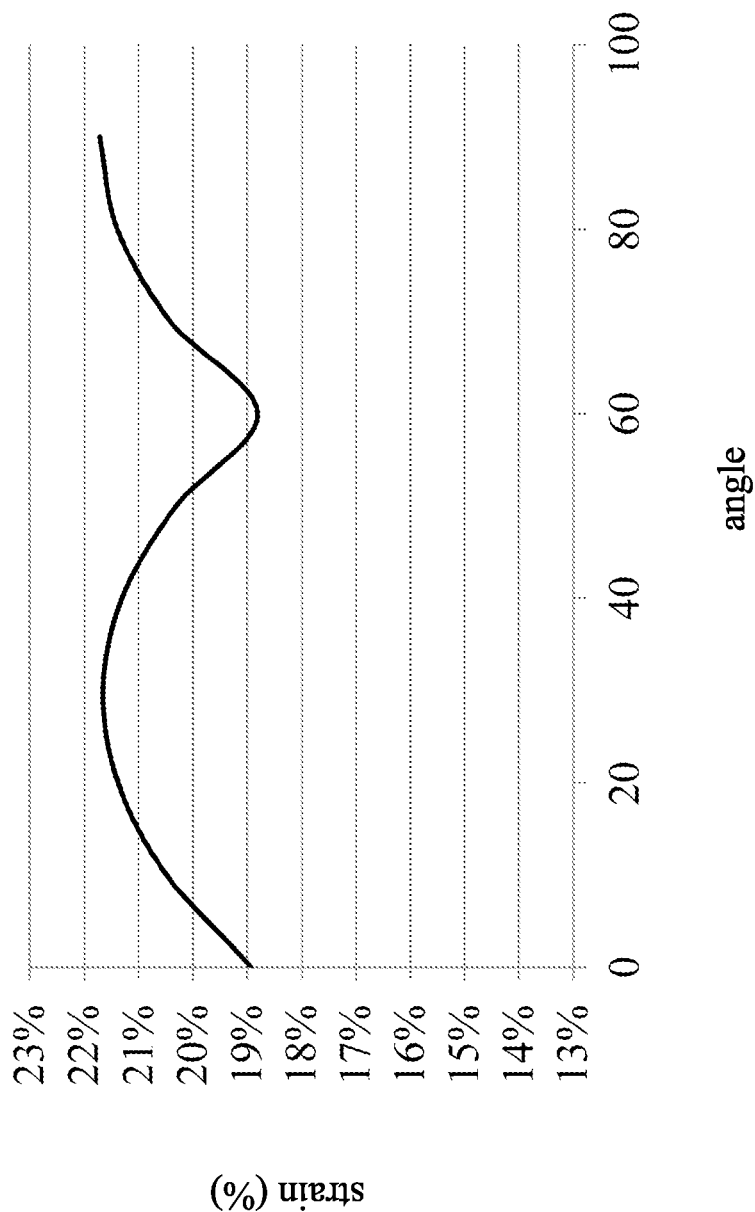
FIG. 1G is a schematic line chart of the equivalent strain of the accommodating structure in FIG. 1C at a particular ratio value of the width to the thickness.

FIG. 1G is a schematic line chart of the equivalent strain of the accommodating structure in FIG. 1C at a particular ratio value of the width to the thickness, in which the "strain" shown in the vertical axis of FIG. 1G is calculated by applying the stress to the accommodating structure 120 in the direction parallel to the direction D1 in FIG. 1D, whereas the "angle" shown in the horizontal axis of FIG. 1G is the included angle θ2 (referring to FIG. 1D). In addition, the line in FIG. 1G is obtained by a simulation calculation at a ratio value of the width 121w to the thickness 121t ranging between 5 and 80.

Referring to FIGS. 1C and 1G, when the ratio value of the width 121w to the thickness 121t ranges between 5 and 80, the accommodating structure 120 has the minimum strain in the direction at the angles θ2 of 0° and 60°. In other words, when the included angle θ2 is 0° or 60°, the accommodating structure 120 has very good structural strength. Accordingly, under the condition that he ratio value of the width 121w to the thickness 121t ranges between 5 and 80, the flexible display panel 100 can be bent (e.g., rolled or folded) around the axis A1 at the included angle θ1 of 90° or 30° repeatedly many times, that is, the axis A1 can be still not substantially parallel to any first sidewall S1 and second sidewall S2 of each of the polygonal microcups 121, or can be substantially parallel to at least one of the second sidewalls S2 of each of the polygonal microcups 121. For example, the axis A1 can be substantially parallel to two of the second sidewalls S2 of the polygonal microcup 121.

Figure 2A:
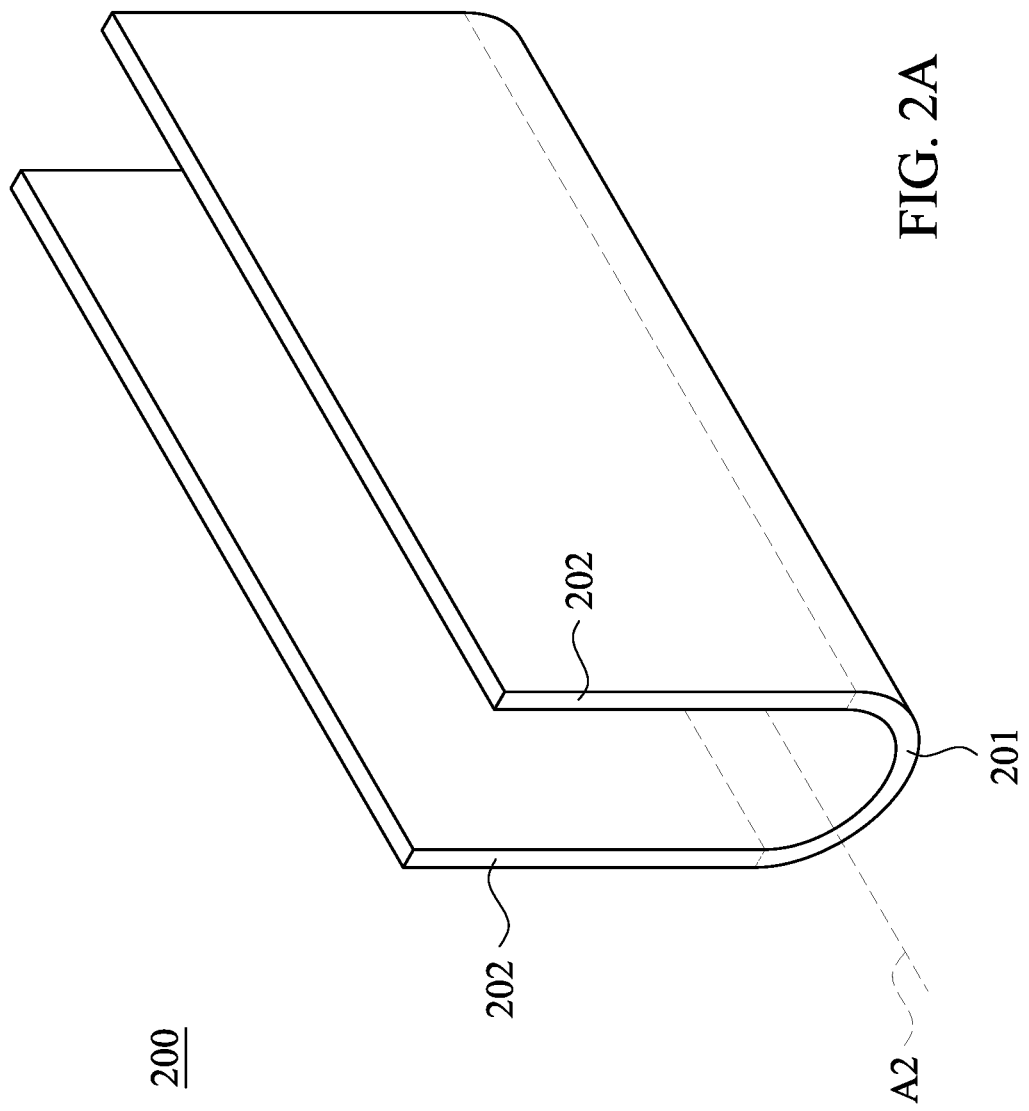
FIG. 2A is a schematic perspective view of a flexible display panel according to another embodiment of the disclosure.

FIG. 2A is a schematic perspective view of a flexible display panel according to another embodiment of the disclosure. Referring to FIG. 2A, the flexible display panel 200 of the embodiment can be bent around the axis A2, and can be folded around the axis A2 repeatedly many times. The flexible display panel 200 has a bendable section 201 and two rigid sections 202, where the bendable section 201 located between the rigid sections 202 is connected to the rigid sections 202. The bendable section 201 can be bent, e.g., folded, so that the axis A2 is located in the bendable section 201, but the rigid sections 202 is rigid and hard to bend.

Figure 2B:
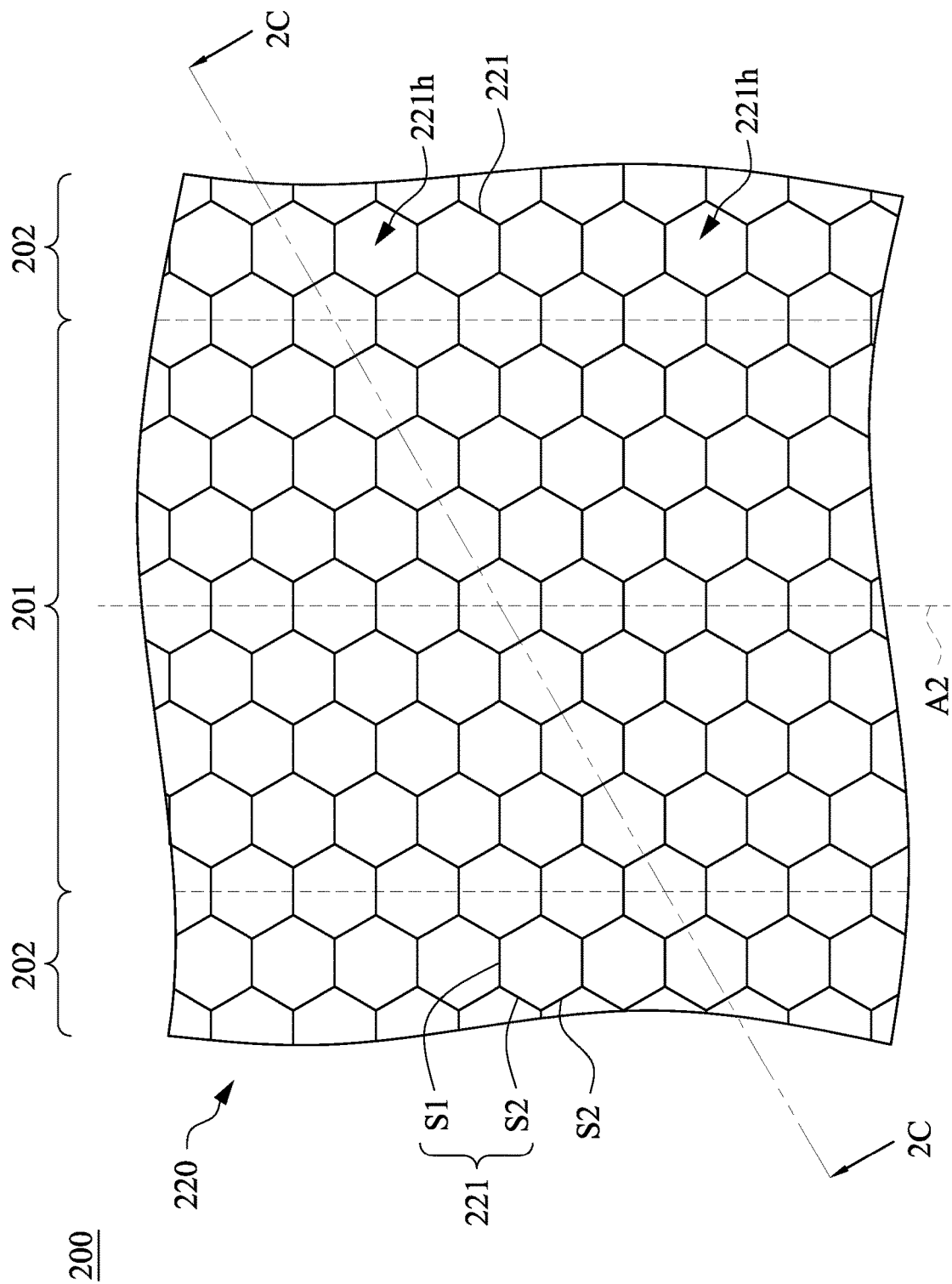
FIG. 2B is a schematic top view of the flexible display panel in FIG. 2A.
Figure 2C:
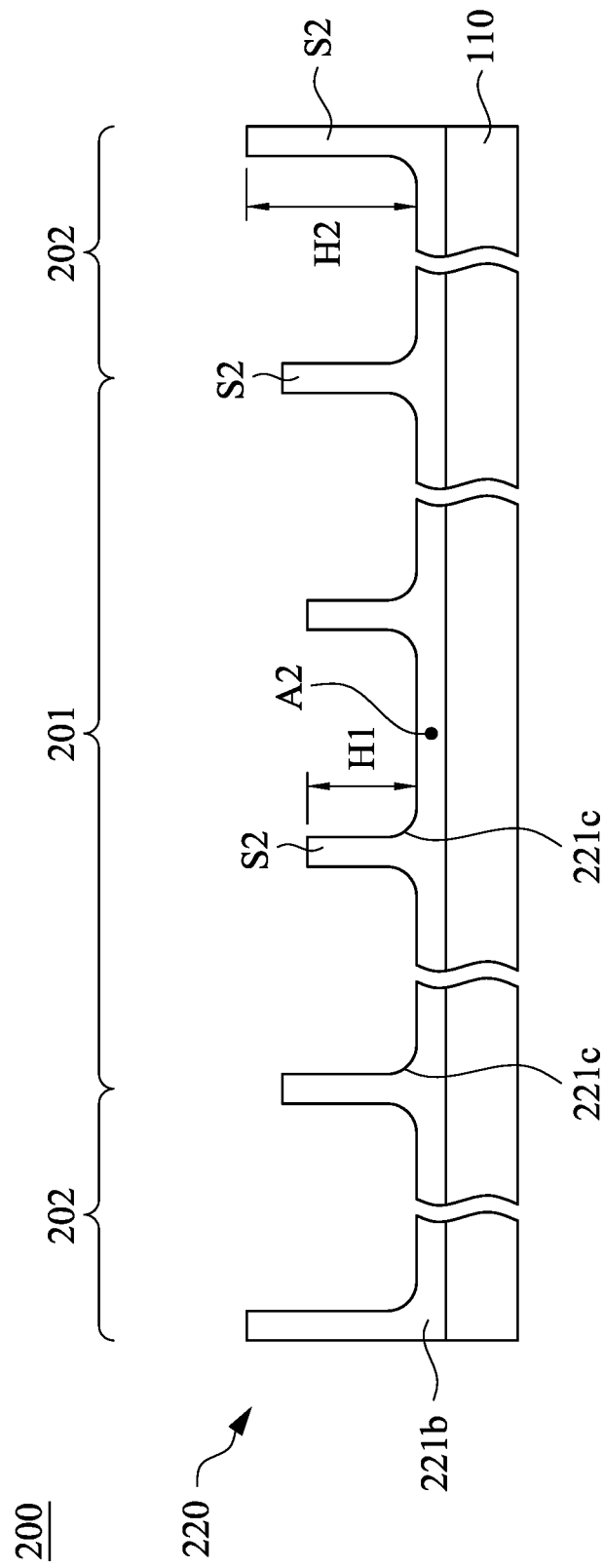
FIG. 2C is a schematic cross-sectional view along a line 2C-2C shown in FIG. 2B.

FIG. 2B is a schematic top view of the flexible display panel in FIG. 2A, and FIG. 2C is a schematic cross-sectional view along a line 2C-2C shown in FIG. 2B. Referring to FIGS. 2B and 2C, the flexible display panel 200 includes an accommodating structure 220, in which the accommodating structure 220 is similar to the accommodating structure 120 in the previous embodiment.

For example, the accommodating structure 220 also includes a plurality of polygonal microcups 221 which are connected to each other and arranged regularly, and each of the polygonal microcups 221 takes the shape of a hexagonal prism basically and has a hole 221h, where the accommodating space of the hole 221h also can take the shape of a hexagonal prism basically and accommodate the image-display ink (not shown), such as electrophoretic ink. In other words, all of the polygonal microcups 221 are hexagonal microcups and can be arranged in a honeycomb.

Unlike the previous embodiment, in the embodiment, the heights of the polygonal microcups 221 are not equal. Specifically, the height H1 of the polygonal microcups 221 in the bendable section 201 is lower than the height H2 of the polygonal microcups 221 in the rigid sections 202, in which the variation in height of the polygonal microcups 221 in the bendable section 201 increases from the axis A2 to the rigid section 202. In other words, the polygonal microcups 221 near the axis A2 have a low height H1, and the polygonal microcups 221 far away from the axis A2 have a high height H1. Hence, it is advantageous to bend the bendable section 201 so that the flexible display panel 200 is easily folded along the axis A2.

Moreover, each of the polygonal microcups 221 can include a bottom layer 221b, a chamfer part 221c, a plurality of first sidewalls S1 (as shown in FIG. 2B, not shown in FIG. 2C), and a plurality of second sidewalls S2. Both the first sidewalls S1 and the second sidewalls S2 are connected to the bottom layer 221b and extend from the bottom layer 221b and in a direction away from the flexible substrate 110. The chamfer part 221c is connected to the first sidewalls S1, the second sidewalls S2, and the bottom layer 221b, and the chamfer part 221c is located at the junction between the bottom layer 221b and both of the first sidewalls S1 and the second sidewalls S2. By using the chamfer part 221c, the cracks between the bottom layer 221b and both of the first sidewall S1 and the second sidewall S2 caused by stress can be reduced, so as to reduce the chance of both the first sidewall S1 and the second sidewall S2 breaking from the bottom layer 221b.

It is worth mentioning that the chamfer part 221c in the embodiment can be applied to the flexible display panel 100 in the previous embodiment. In other words, in the preceding accommodating structure 120, each of the polygonal microcups 121 further includes a bottom layer (not shown), and the chamfer parts 221c can be formed at the junctions between the bottom layer and both of the first sidewalls S1 and the second sidewalls S2 in the polygonal microcups 121. Hence, the chamfer part 221c is not limited to being in the polygonal microcup 221.

Figure 3:
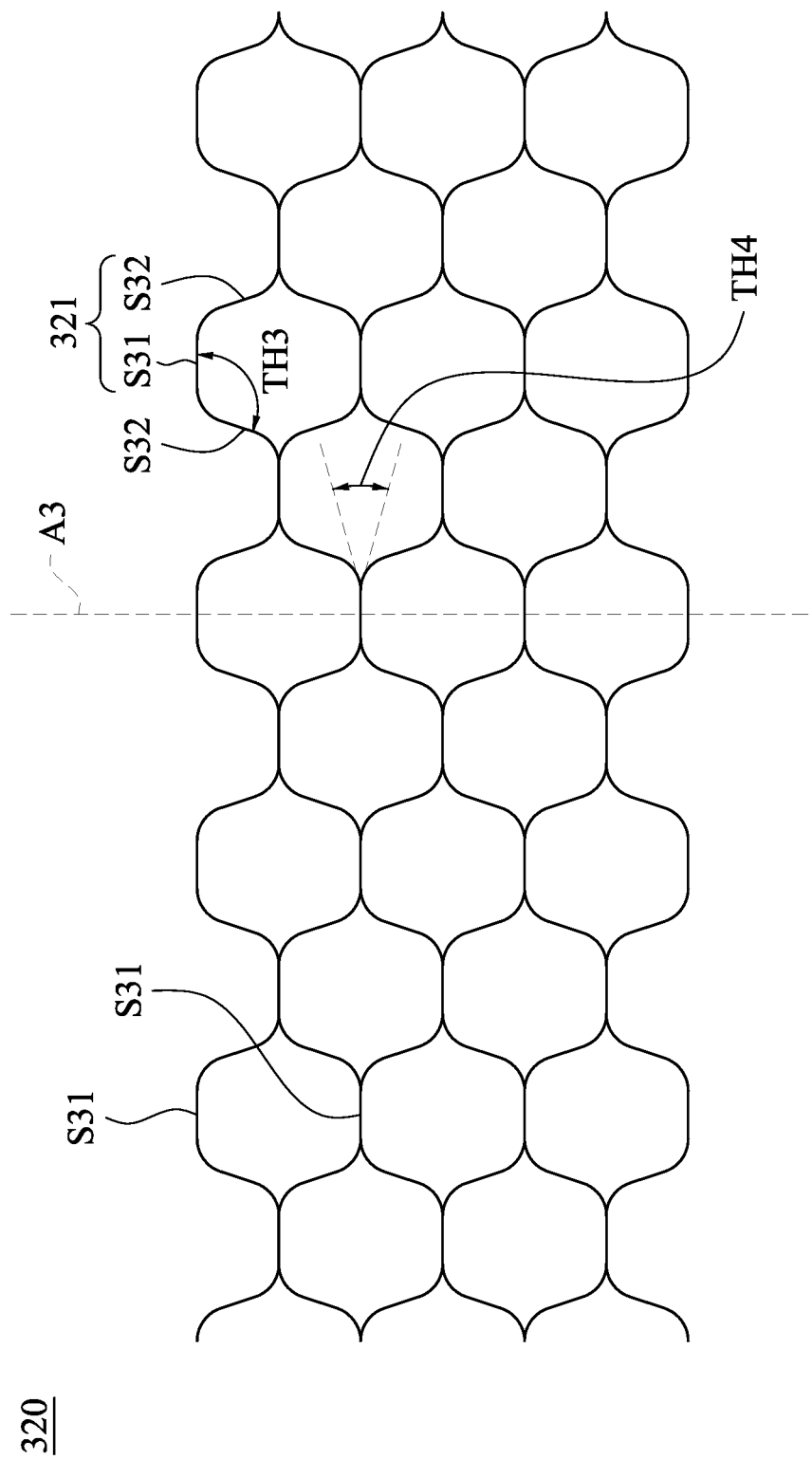
FIG. 3 is a schematic top view of an accommodating structure according to another embodiment of the disclosure.

FIG. 3 is a schematic top view of an accommodating structure according to another embodiment of the disclosure. Referring to FIG. 3, the accommodating structure 320 is similar to the previous accommodating structure 120. The accommodating structure 320 can be applied to the flexible display panels 100 and 200 in the previous embodiments, and can be bent around the axis A3. Hence, each of the accommodating structures 120 and 220 in the previous embodiments can be replaced by the accommodating structure 320.

Unlike the accommodating structure 120 of the previous embodiment, the accommodating structure 320 shown by the embodiment in FIG. 3 includes a plurality of polygonal microcups 321 which are connected to each other and arranged in a honeycomb, and each of the polygonal microcups 321 includes a plurality of first sidewalls S31 and a plurality of second sidewalls S32. The first sidewalls S31 are connected to the second sidewalls S32, and a round angle TH3 can be formed between the first sidewall S31 and the second sidewall S32 which are connected to and adjacent to each other. In addition, two second sidewalls S32 that are connected to and adjacent to each other respectively have two curved surfaces (not shown) connected to each other, and an acute angle TH4 is formed between two curved surfaces, as shown in FIG. 3.

Figure 4A:
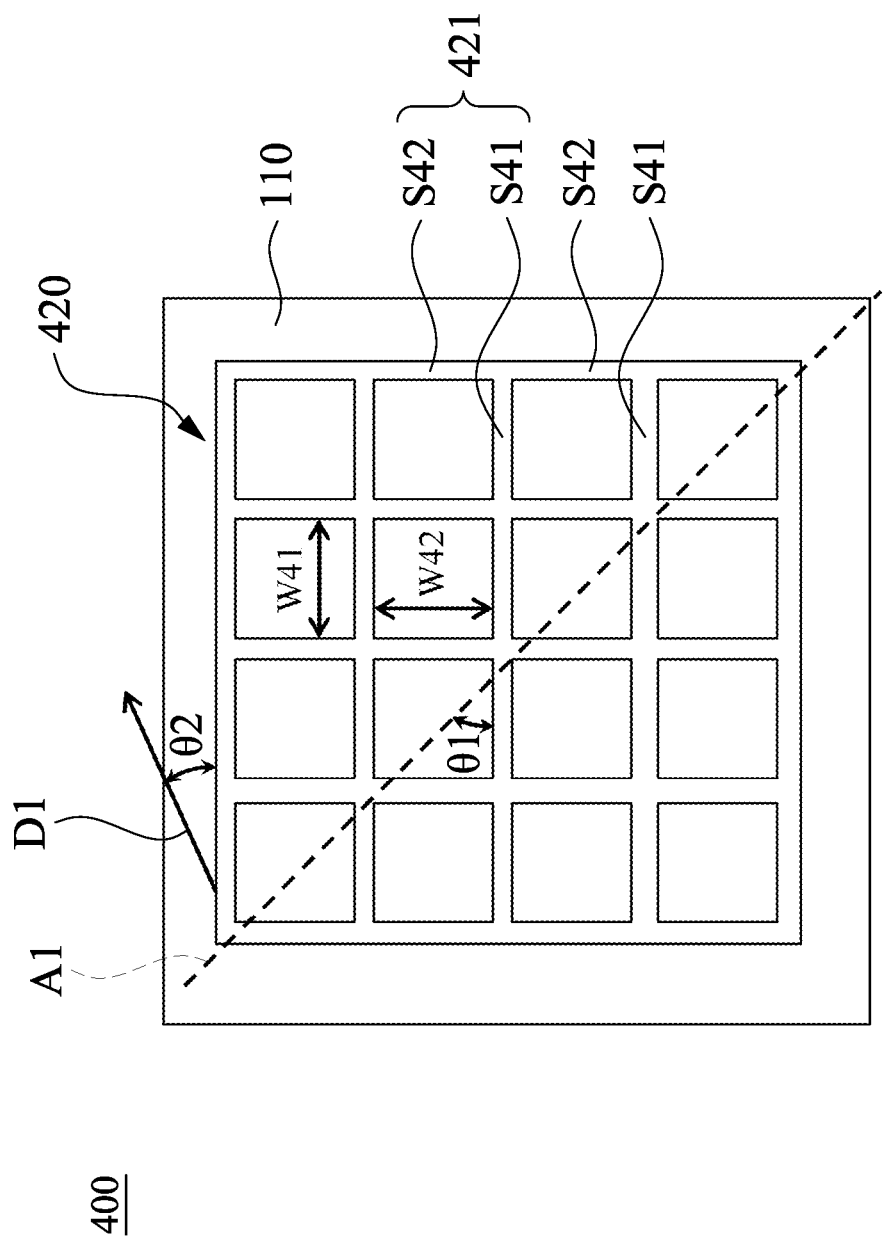
FIG. 4A is a schematic top view of a flexible display panel according to another embodiment of the disclosure.

FIG. 4A is a schematic top view of a flexible display panel according to another embodiment of the disclosure. Referring to FIG. 4A, the flexible display panel 400 of the embodiment includes a flexible substrate 110 and an accommodating structure 420, in which the accommodating structure 420 is disposed on the surface 112 of the flexible substrate 110, and the material of the accommodating structure 420 can be the same as the material of the accommodating structure 120. In addition, the accommodating structure 420 also includes a plurality of polygonal microcups 421 which are connected to each other and arranged regularly.

Unlike the previous embodiment, each of the polygonal microcups 421 can be a quadrilateral microcup, and the quadrilateral microcups can be arranged in a matrix. Each of the polygonal microcups 421 includes two first sidewalls S41 and two second sidewalls S42, in which the second sidewalls S42 is connected to the first sidewalls S41. Both of the first sidewalls S41 are opposite to and substantially parallel to each other, and both of the second sidewalls S42 are opposite to and substantially parallel to each other, where the included angle θ1 between the axis A1 and the first sidewall S41 can be larger than 60°, and less than or equal to 90°. For example, the included angle θ1 can be equal to 45°.

The widths W41 and W42 of both of the first sidewalls S41 and the second sidewalls S42 are equal to each other, that is, any two of the sidewalls (i.e., first sidewall S41 or second sidewall S42) of each of the polygonal microcups 421 have the equal widths (i.e., widths W41 and W42). Moreover, the first sidewall S41 and the second sidewall S42 connected to each other are perpendicular to each other. Thus, the polygonal microcup 421 can be a square microcup.

Figure 4B:
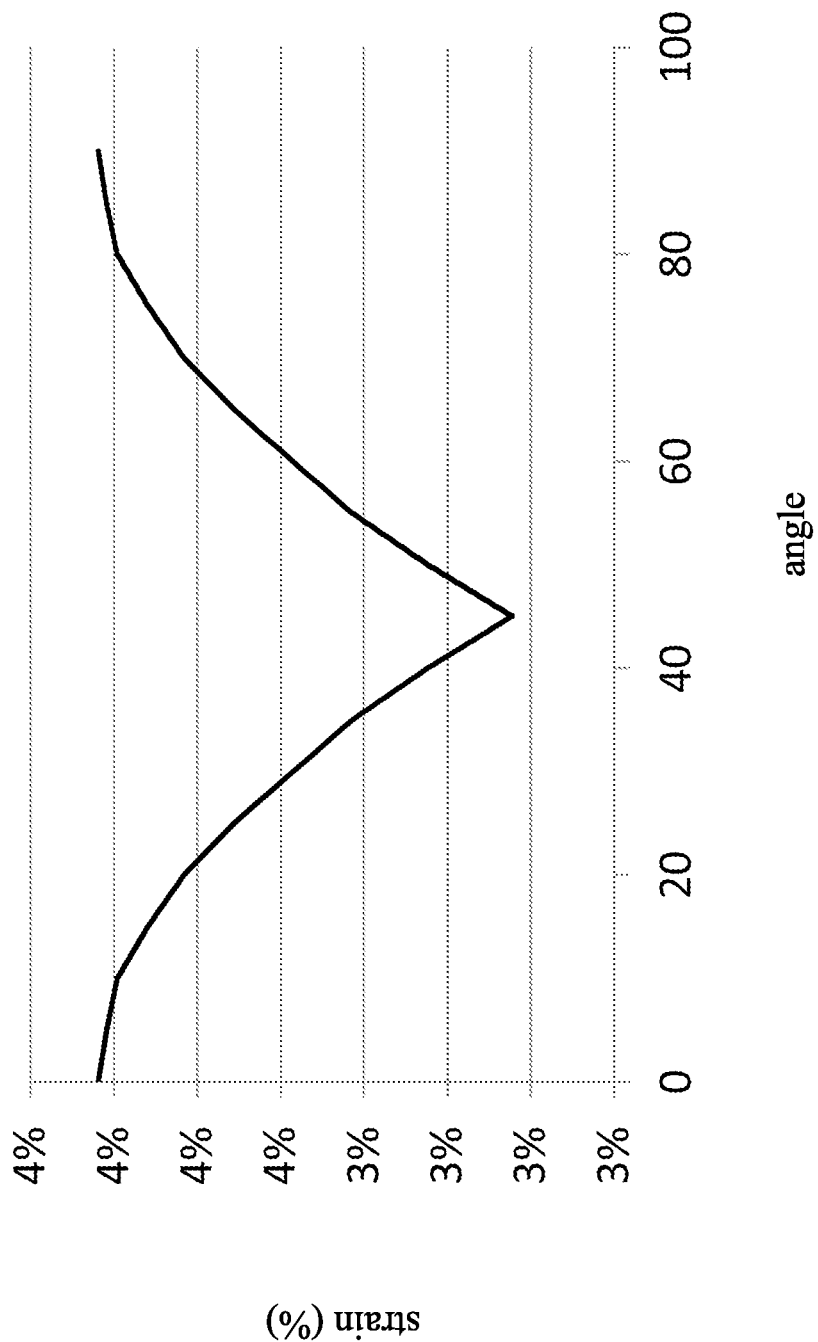
FIG. 4B is a schematic line chart of the equivalent strain of the accommodating structure in FIG. 4A.

FIG. 4B is a schematic line chart of the equivalent strain of the accommodating structure in FIG. 4A, where the "strain" shown in the vertical axis of FIG. 4B is calculated by applying the stress to the accommodating structure 420 in the direction parallel to the direction D1 in FIG. 4A, whereas the "angle" shown in the horizontal axis of FIG. 4B is the included angle θ2 in FIG. 4A. In addition, the line in FIG. 4B is obtained by a simulation calculation.

Referring to FIGS. 4A and 4B, it can be known from FIG. 4B that the accommodating structure 420 has the minimum strain in the direction at the angles θ2 of 45°. In other words, when the included angle θ2 is 45°, the accommodating structure 420 has very good structural strength. Accordingly, the flexible display panel 400 can be bent (e.g., rolled or folded) around the axis A1 at the included angle θ1 of 45° repeatedly many times, that is, the axis A1 is not substantially parallel to any one of the first sidewalls S41s and the second sidewalls S42 of each of the polygonal microcups 421.

Figure 5A:
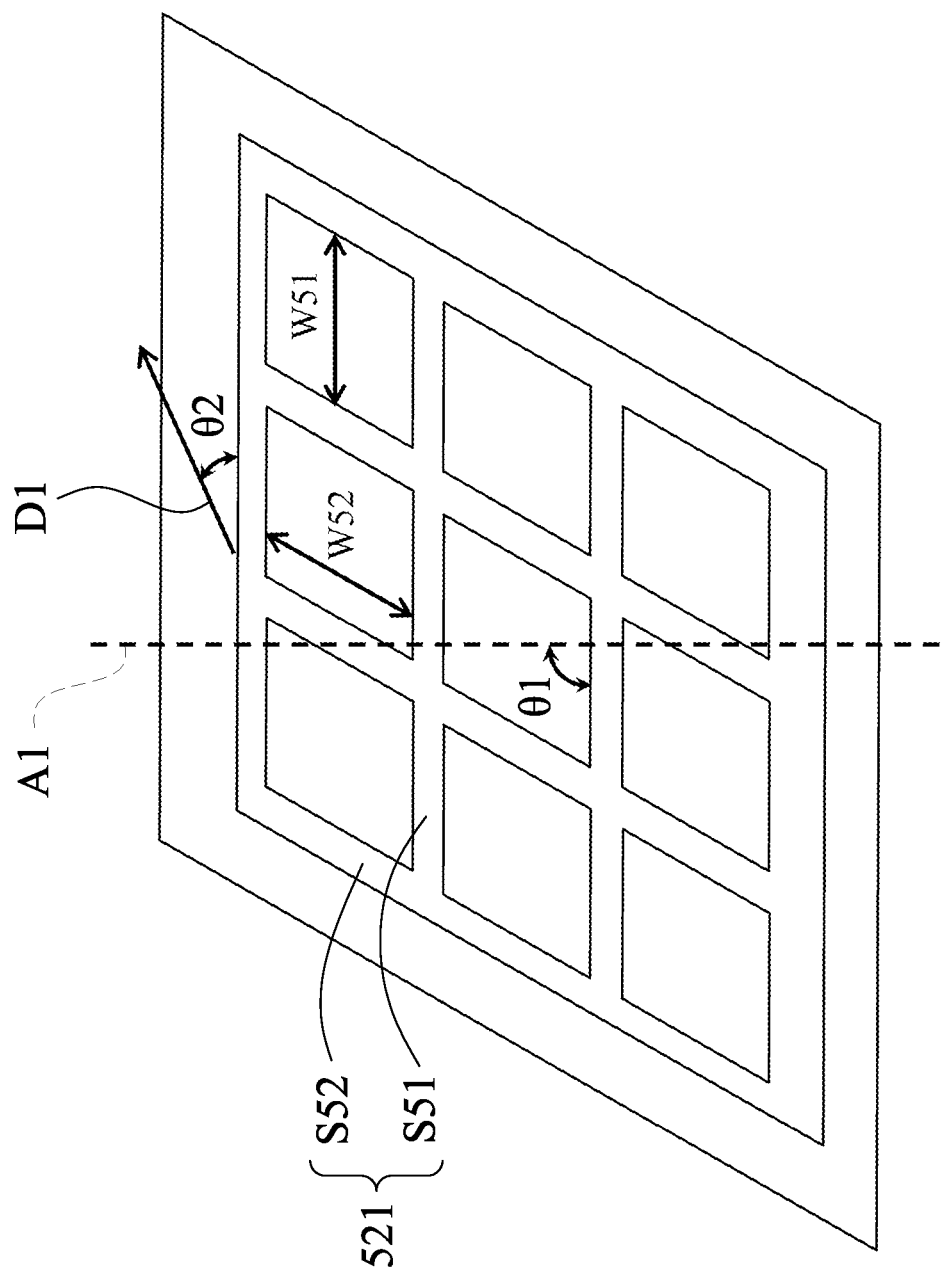
FIG. 5A is a schematic top view of a flexible display panel according to another embodiment of the disclosure.

FIG. 5A is a schematic top view of a flexible display panel according to another embodiment of the disclosure. Referring to FIG. 5A, the flexible display panel 500 of the embodiment is similar to the flexible display panel 400. For example, the flexible display panel 500 of the embodiment includes the flexible substrate 110 and an accommodating structure 520, in which the accommodating structure 520 is disposed on the surface 112 of the flexible substrate 110, and the material of the accommodating structure 520 can be the same as the material of the accommodating structure 120. In addition, the accommodating structure 520 also includes a plurality of polygonal microcups 521 which are connected to each other and arranged regularly, and each of the polygonal microcups 521 can be a quadrilateral microcup.

However, unlike the polygonal microcup 521 in the previous embodiment, each of the polygonal microcups 521 can be a rhombic microcup, not the square microcup. Specifically, each of the polygonal microcups 521 includes two first sidewalls S51 and two second sidewalls S52, in which the second sidewalls S52 are connected to the first sidewalls S51. Both of the first sidewalls S51 are opposite to and substantially parallel to each other, and both of the second sidewalls S52 are opposite to and substantially parallel to each other.

The widths W51 and W52 of both of the first sidewalls S51 and the second sidewalls S52 are equal to each other, and the first sidewall S51 and the second sidewall S52 connected to each other are not perpendicular to each other, so that each of the polygonal microcups 521 can be the rhombic microcup, not the square microcup. Moreover, the included angle θ1 between the axis A1 and the first sidewall S51 can be larger than 60°, and less than or equal to 90°.

Figure 5B:
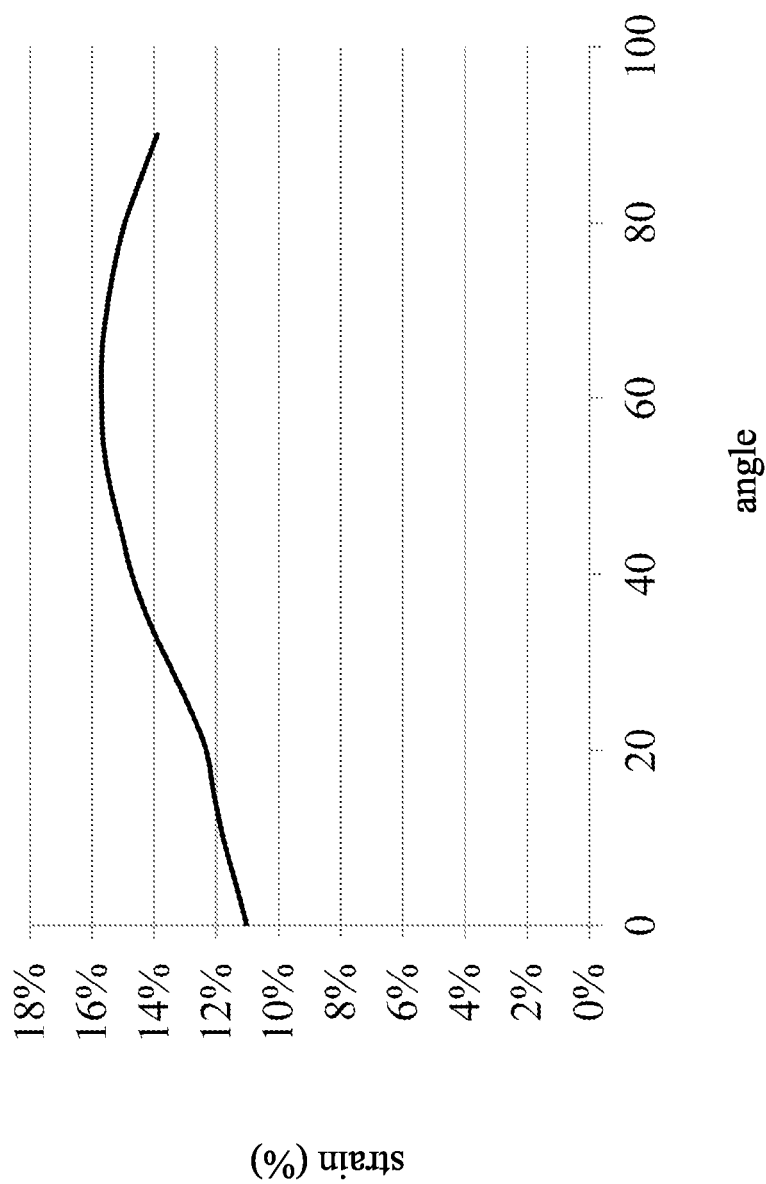
FIG. 5B is a schematic line chart of the equivalent strain of the accommodating structure in FIG. 5A.

FIG. 5B is a schematic line chart of the equivalent strain of the accommodating structure in FIG. 5A, in which the "strain" shown in the vertical axis of FIG. 5B is calculated by applying the stress to the accommodating structure 520 in the direction parallel to the direction D1 in FIG. 5A, whereas the "angle" shown in the horizontal axis of FIG. 5B is the included angle θ2 in FIG. 5A. In addition, the line in FIG. 5B is obtained by a simulation calculation.

Referring to FIGS. 5A and 5B, it can be known from FIG. 5B that the accommodating structure 520 has the minimum strain in the direction at the angles θ2 of 0°. In other words, when the included angle θ2 is 0°, the accommodating structure 520 has very good structural strength. Accordingly, the flexible display panel 500 can be bent (e.g., rolled or folded) around the axis A1 at the included angle θ1 of 90° repeatedly many times, that is, the axis A1 is not substantially parallel to any one of the first sidewalls S51 and the second sidewalls S52 of each of the polygonal microcups 521, and can be perpendicular to the first sidewall S51.

Consequently, under the condition that the axis is not substantially parallel to any sidewall (e.g., first sidewall S1 or second sidewall S2) of each of the polygonal microcups, the accommodating structure has good or the best shear strength, so that the flexible display panel disclosed by at least one embodiment of the disclosure can be bent (e.g., rolled or folded) around the axis repeatedly many times. Accordingly, the accommodating structure can enhance the tolerant strength of the flexible display panel. In contrast to the existing flexible display panel, the flexible display panel bent around the axis can withstand more times of bending, thereby having a longer lifetime.

In addition, although the accommodating structure may be made of a low-cost material of slightly poor quality, the accommodating structure also can enhance the tolerant strength of the flexible display panel by the above accommodating structure and the axis not parallel to any sidewall of the polygonal microcups, so that the flexible display panel is able to withstand certain times of bending. In other words, in order to maintain or improve the times of bending which the flexible display panel can withstand, the material costs of the accommodating structure can be reduced, thereby enabling the costs of the flexible display panel to decrease.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A flexible display panel, capable of being bent around an axis and comprising:
   a flexible substrate; and
   an accommodating structure, disposed on the flexible substrate and comprising a top surface and a plurality of polygonal microcups connected to each other, wherein the polygonal microcups are arranged regularly, and the axis is not substantially parallel to any sidewall of each of the polygonal microcups,
   wherein the flexible display panel has a bendable section and two rigid sections that are each less bendable than the bendable section, the bendable section is located between the two rigid sections, and the axis is located in the bendable section,
   wherein each polygonal microcup has a height extending from a bottom surface of the microcup to the top surface of the accommodating structure,
   wherein the heights of the polygonal microcups in the bendable section is are lower than the height of the polygonal microcups in the rigid sections, and
   wherein the heights of the polygonal microcups in the bendable section increasingly increase from the axis to the to the rigid sections.

2. The flexible display panel of claim 1, wherein each of the polygonal microcups comprises:
   two first sidewalls, opposite to and substantially parallel to each other and; and
   a plurality of second sidewalls, connect to the first sidewalls, wherein the first sidewalls lie in a plurality of reference planes parallel to each other, and an included angle between the axis and the reference plane is larger than 60°, and less than or equal to 90°.

3. The flexible display panel of claim 2, wherein the axis is substantially perpendicular to the reference planes.

4. The flexible display panel of claim 2, wherein each of the polygonal microcups further includes a bottom layer and a chamfer part, and both the first sidewalls and the second sidewalls are connected to the bottom layer, and extend from the bottom layer and in a direction away from the flexible substrate,
   wherein the chamfer part connected to the first sidewalls, the second sidewalls, and the bottom layer is located at a junction between the bottom layer and both of the first sidewalls and the second sidewalls.

5. The flexible display panel of claim 2, wherein a round angle is formed between the first sidewall and the second sidewall which are connected to and adjacent to each other.

6. The flexible display panel of claim 2, wherein two of the second sidewalls which are connected to and adjacent to each other have two curved surfaces connected to each other respectively, and an acute angle is formed between the two curved surfaces.

7. The flexible display panel of claim 1, wherein each of the polygonal microcups is a quadrilateral microcup and comprises:
two first sidewalls, opposite to and substantially parallel to each other; and
two second sidewalls, opposite to and substantially parallel to each other, wherein the second sidewalls are connected to the first sidewalls, and an included angle between the axis and the first sidewall is larger than 60°, and less than or equal to 90°.

8. The flexible display panel of claim 7, wherein widths of both of the first sidewalls and the second sidewalls are equal to each other.

9. The flexible display panel of claim 8, wherein the first sidewall and the second sidewall connected to each other are perpendicular to each other, and the polygonal microcup is a square microcup.

10. The flexible display panel of claim 1, wherein each of the polygonal microcups has a width and a thickness, wherein a ratio value of the width to the thickness ranges between 0.5 and 1.5.

11. The flexible display panel of claim 1, wherein a material of the accommodating structure is selected from the group consisting of epoxy acrylate, urethane, and polymethyl-methacrylate.

* * * * *